March 4, 1952  G. P. STOUT  2,587,664
PRESENCE OF CROWN DETECTORS
Filed Sept. 26, 1947  3 Sheets-Sheet 1
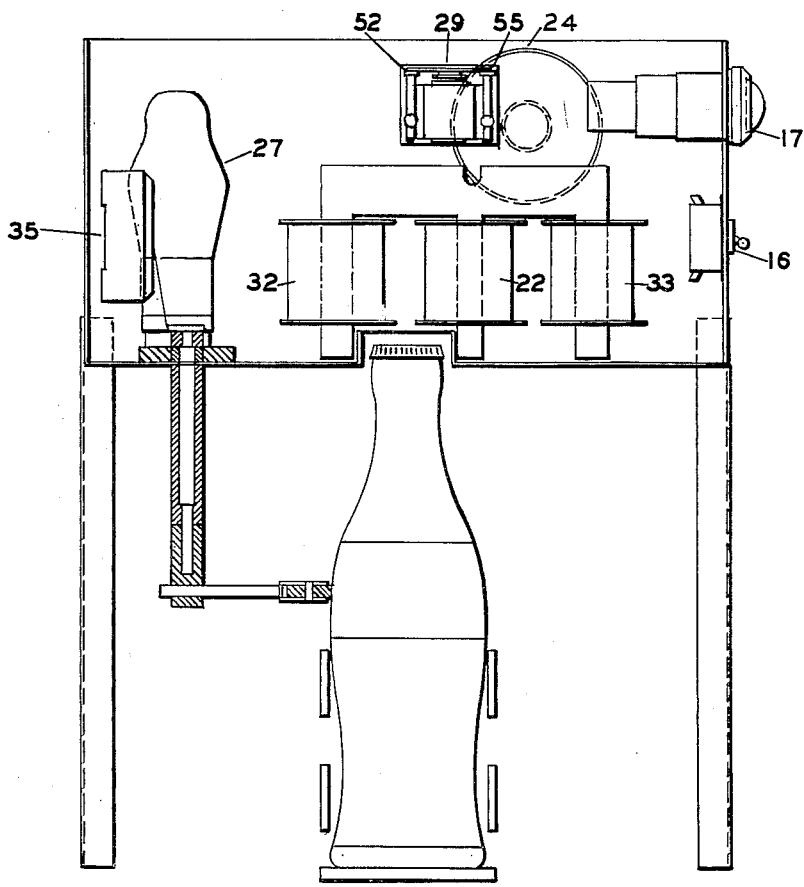
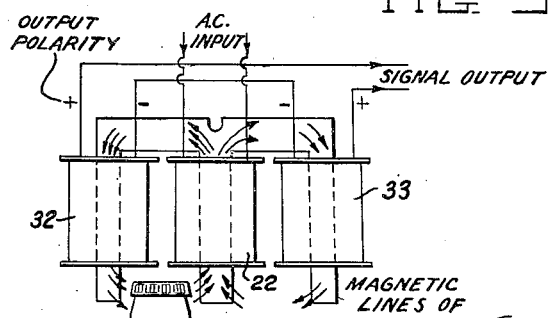
GEORGE PHILIP STOUT INVENTOR.
BY March 4, 1952 G. P. STOUT 2,587,664
PRESENCE OF CROWN DETECTORS
Filed Sept. 26, 1947 3 Sheets-Sheet 2
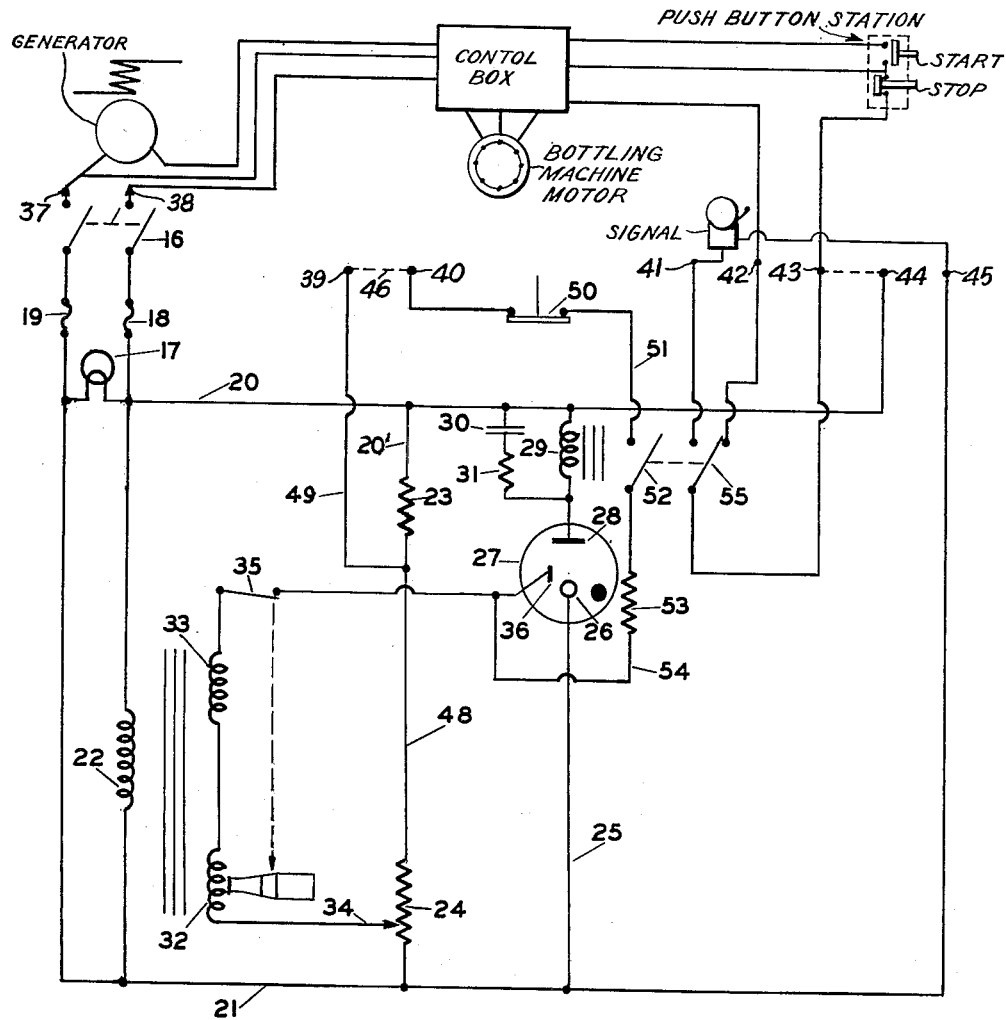
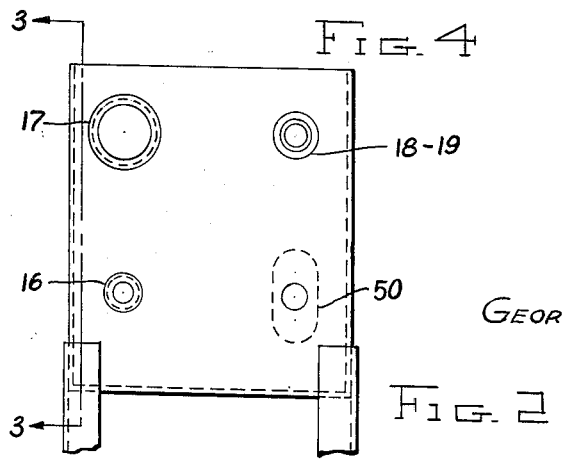
GEORGE PHILIP STOUT INVENTOR.
BY
Jewett and Mead
Attorneys March 4, 1952

G. P. STOUT 2,587,664

PRESENCE OF CROWN DETECTORS

Filed Sept. 26, 1947

GEORGE PHILIP STOUT INVENTOR.

BY
Jewett and Mead
attorneys

Patented Mar. 4, 1952

2,587,664

UNITED STATES PATENT OFFICE 2,587,664

PRESENCE OF CROWN DETECTORS

George Philip Stout, Baltimore, Md.

Application September 26, 1947, Serial No. 776,369

4 Claims. (Cl. 250—27)

The invention relates to crown detectors and has as an object the provision of a device for testing containers as beverage bottles, to automatically determine that a capping or crowning machine has functioned properly to cap each container passed therethrough.

It is a further object of the invention to provide a device that will cause the actuation of a circuit closer or circuit closers upon failure of a capping machine to place a cap on any container passing through the machine.

It is a further object of the invention to test bottles for the presence of a cap without physical contact between any part of the testing device and the cap.

It is a further object of the invention to provide a testing device of the character referred to which utilizes a magnetic property of the material of a crown cap to determine the presence thereof.

It is a further object of the invention to provide a device for testing bottles for the presence of a cap which device will cause the closure or opening of an electrical circuit if a cap be absent, whereby an alarm may be actuated or the capping machine may be stopped or both such results may be secured.

It is a further object to provide apparatus functioning to take preliminary action if a cap is missing from one bottle as the giving of an alarm; followed by other action if the operation of the capping machine continue to be defective for a predetermined length of time.

Further objects will appear from the following description when read in connection with the accompanying drawings showing illustrative embodiments of the invention and wherein Figure 1 is a diagrammatic showing of a special transformer or sensing device utilized;

Figure 2 is a front view of the structure of Figure 3 omitting the bottle and circuit closer arm;

Figure 3 is a side elevation partly in section on line 3—3 of Figure 2 showing the apparatus during a test;

Figure 4 is a diagram of circuits; and

Figure 5:
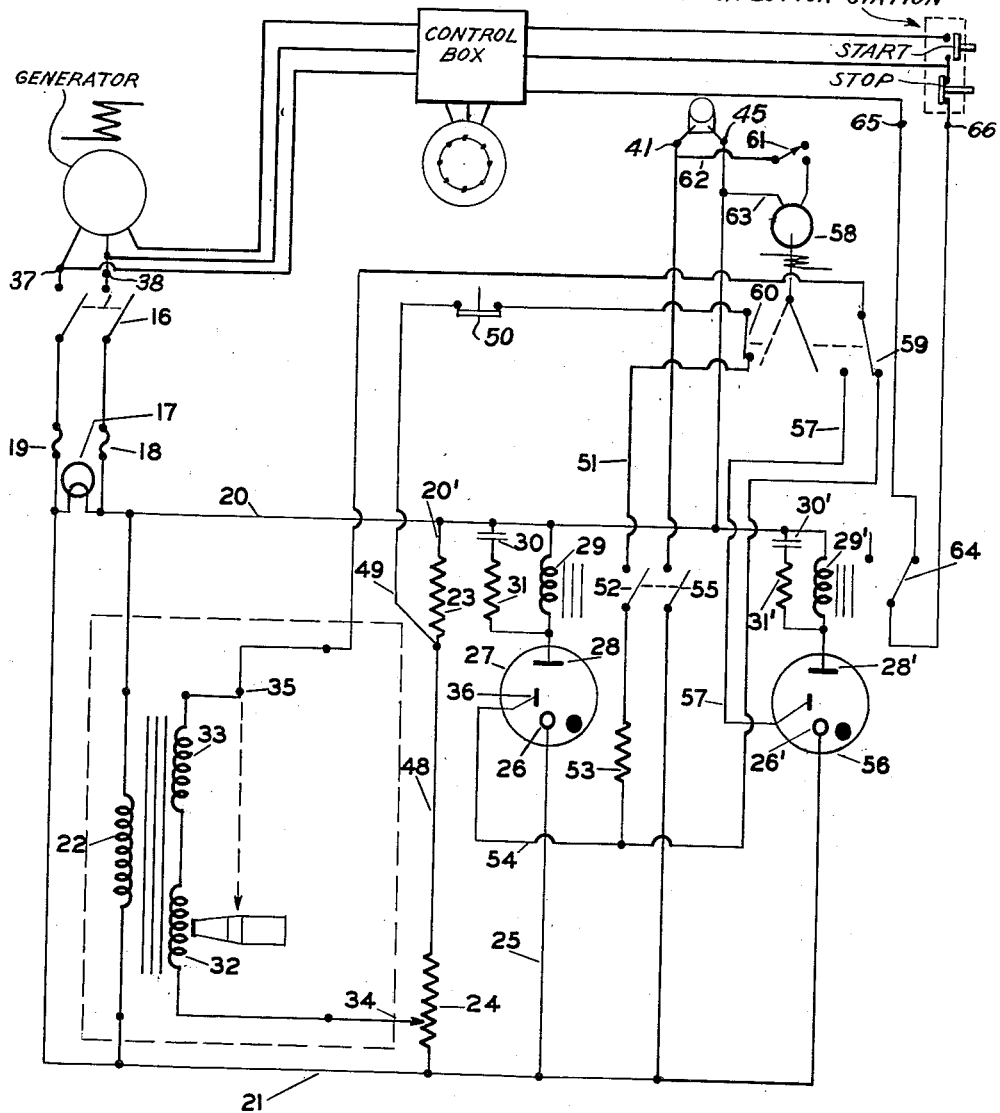
Figure 5 is a diagram of circuits of a second form showing the timing device for delayed action.

For the purpose of placing caps on bottles, especially for use in the beverage industry, bottle capping machines are in use to which and from which bottles are conducted on conveyors, in such a manner that the capping of the bottles is largely automatic.

Failure of a bottle to receive a cap sometimes occurs, usually by a defective cap or failure of the cap supply to the capping machine. Such failure may result in a single bottle being capless or if the cap supply chute becomes jammed, all succeeding bottles may be without caps until the condition is rectified.

Devices have been proposed for the present purpose utilizing a mechanical feeler supported adjacent the path of the bottles to contact the caps (if present) of the passing bottles. A difficulty with devices of this character is that the capped mouths of the bottles must travel in a path allowing small tolerance in order to secure proper contact with the feeler.

In accordance with the present invention, nothing comes into contact with the bottle caps in order to evidence their presence. Instead of a physical contact, the device of the invention utilizes the effect of the iron content of the crown caps to affect magnetic flux between poles of a special transformer, thus allowing a tolerance of path well within that readily secured on a usual conveyor.

To utilize the effect of influence on magnetic flux through the passing crown to sense its presence, the invention as shown utilizes a special transformer comprising a primary and two secondaries, these secondaries are connected in series but reversely wound and so connected that normally there is no voltage output when a circuit is closed through the primary of the transformer. The output from the secondaries is connected with a network wherein, in the absence of said output, a vacuum tube becomes conductive to pass current to a relay, a closure of which gives an alarm or takes other measures to the correction of the capping defect. An output from said secondaries in the presence of a cap, where it should be, is utilized to block the firing of said tube.

In the preferred form of the invention, a special transformer, indicated in Figure 1, is utilized, comprising an E shaped core with a primary coil 22 on the center leg and reversely wound secondaries 32 and 33 on the outside legs, and connected in series. The legs of the core protrude and for test the mouth of a bottle that should carry a cap is made to pass between projecting poles as shown.

In accordance with one form of the invention and as shown in Figure 4, a power input is indicated at 15, controlled by a double pole switch 16. The source of energy may be the usual commercial 115 volt alternating current. A pilot light is indicated at 17 to indicate the energized condition of the circuit. Fuses 18 and 19 are provided to protect the system. Wires 20 and 21 are shown connected to the two sides of the source of energy, and the primary 22 of the special transformer is shown as connected between wires 20 and 21.

Also connected between the wires 20 and 21 is a wire 20' including a fixed resistance 23 and a variable resistance or potentiometer 24 functioning as a bias resistor. A wire 25 is shown leading from wire 21 to the cathode 26 of a filamentless or cold cathode three element gas tube 27, the anode (or plate) 28 of which is connected through the coil 29 of a relay to the wire 20.

To quiet the operation of the relay a filter, comprising capacity 30 and a current limiting resistance 31, is placed in shunt with the relay coil.

The reversely wound series connected secondaries 32 and 33 of the transformer are shown as connected from the adjustable element 34 of the potentiometer 24 through switch 35 to the grid 36 of tube 27. The switch 35 is the bottle position switch, it being closed by the bottle during the checking operation.

To connect the devices so far described to a power source, to an alarm or to a motor control circuit, and to enable a change of controls, terminals 37—45 are shown which may be located on the outside of a cabinet.

Terminals 37 and 38 are for connection to a power source. Terminals 39 and 40 and also 43 and 44 are substitutes for switches, being shown as connected by jumpers 46 and 47, respectively, which may be removed in changing the manner of use of the apparatus.

It will be seen that with no crown present between the projecting cores of the transformer at one side thereof, when the switch 35 is closed (by the presence of a bottle) the secondaries will neutralize each other and there will be no output from the transformer as such because of the equal and opposite currents induced in secondaries 32, 33 by the primary 22. In this case, sufficient voltage will be applied to the grid 36 from wire 21, a part of resistance 24, coils 32, 33 closed switch 35 to the grid to cause the tube to be conductive. The current through the conductive tube from wire 21, 25, the tube, coil 29 to wire 20 will cause coil 29 to close contacts 52 and 55 thus providing a path from wire 20 to terminal 44, jumper 47, contact 55 terminal 41, an alarm, terminal 45 to wire 21. The conductive condition of the tube will be preserved from wire 48 through 49, jumper 46 normally closed reset switch 50, wires 51 relay contacts 52 wire 54 current limiting resistance 53 until switch 50 is opened. This is the condition when jumpers 46 and 47 are in place and an alarm is connected between terminals 41 and 45. On the other hand, with a normally capped bottle considerably more voltage is produced in leg 32 of the special transformer (due to the better magnetic path) than in leg 33, the net result is a voltage that is of opposite phase to that produced from the resistor networks 23 and 24. This voltage subtracts from the voltage normally present at slider 34 on the potentiometer and is of such magnitude that the cold cathode tube does not fire. Thus the only moving part for normal bottles is the bottle feeler switch 35.

If it be desired to cause this circuit to control the drive motor of a machine, the jumpers 46 and 47 will be removed and the circuit of the motor will be connected to terminals 42 and 43. Then when the tube 27 is conductive, the relay 29 will break the motor control circuit at contacts 55, in which case the motor will stop. The motor is re-started in the usual way by pushing the start button, as when the bad bottle clears the crown detector contacts 55 again restore the motor stop circuit.

In the form of Figure 5, a second cold cathode tube 56 is shown connected by a wire 57, to a contact of synchronous timer 58 which has two sets of contacts. One, 59, switches the sensing device from tube 27 to tube 56 on a very slight time delay, while the other 60 in series with Reset switch 50, recycles the unit after a predetermined number of seconds.

With the switch 61 in the position shown and with an alarm connected to terminals 41 and 45, the device will function as does the circuit of Figure 4 with the jumpers 46 and 47 in place.

With the switch 61 in the alternate or closed position, firing of tube 27 will actuate relay 29 and through contacts 55 will energize the time switch 58 over wires 62 and 63. The alarm will be actuated through normally open contact 55 also. Tube 56 will now be in condition of "looking for" a second bad bottle to occur within a predetermined time determined by the time switch (due to contacts 59 transferring sensing device to this second tube). Should the condition of the capless bottles not persist, the time switch will open switch 60 stopping the alarm, and recycling the unit. Should the second bottle without a crown appear before the switch 60 is opened, tube 56 will fire actuating relay 29' to open contacts 64 (connected to terminals 65—66 momentarily opening the stop circuit of the magnetic switch controlling the motor) and stop the drive motor of the machine.

It will be seen from the above description that the device of Figure 5 as outlined is so arranged that it can sound an alarm for superficial trouble, and stop the bottling operation instantly should serious crowning difficulties develop. This is highly desirable from the standpoint of production.

Instead of the special transformer shown, it will be obvious that two separate transformers of a usual type may be used, the crown being moved between projecting core ends of one transformer and the change of voltage may be produced in the remaining transformer. Or any source of voltage may be utilized and neutralized by the crown testing transformer.

It is obvious that two reversely wound primaries may be placed on the outside legs of the transformers with a single secondary on the center leg, to provide substantially zero output of the secondary when no crown is present.

Minor changes may be made in the physical embodiments of the invention within the scope of the appended claims without departing from the spirit of the invention.

I claim:

1. Apparatus for testing the mouths of containers to determine the presence of a closure having content of magnetic material comprising, in combination: transformer means including a core positioned to permit passage adjacent thereto of the mouths of containers to be tested for the presence of a closure, a primary winding energized from an associated power source, and a secondary winding associated therewith; a switch closed when a container is in testing position; and a network connected to said secondary winding through said switch, including: a normally non-conducting vacuum tube controlling, when conducting, a subsidiary circuit, and a bias resistor for said tube energized from said associated power source, the voltage in said secondary winding being balanced in said network against a voltage derived from said bias resistor to maintain said tube non-conducting when a capped container passes adjacent to said transformer core and being unbalanced in said network against a voltage derived from said resistor when an uncapped container passes adjacent to said transformer core to render said tube conducting and control said subsidiary circuit.

2. Apparatus for testing the mouths of containers to determine the presence of a closure having content of magnetic material comprising, in combination: transformer means including a core positioned to permit passage adjacent thereto of the mouths of containers to be tested for a closure, a primary winding energized from an associated power source, and a secondary winding associated therewith; a switch closed when a container is in testing position; and a network connected to said secondary winding through said switch including: a bias resistor energized from said associated power source, a timed circuit closer, a first normally non-conducting vacuum tube, and a second normally non-conducting vacuum tube, the voltage output of said secondary being balanced in said network against the voltage derived from said bias resistor to maintain said first tube non-conducting when a capped container passes adjacent to said transformer core and being unbalanced thereby rendering said first tube conducting and controlling said timed circuit closer when an uncapped container passes adjacent to said transformer core to temporarily connect said second tube in said network, whereby an unbalance in said network between said secondary winding output voltage and said bias resistor voltage occurring when a second uncapped container passes adjacent to said transformer core renders said second tube conducting to control a subsidiary circuit, said timed circuit closer upon the occurrence of a predetermined time delay between the passage of the first and second uncapped containers automatically operating to reconnect said first tube and disconnect said second tube.

3. Apparatus for testing the mouths of containers to determine the presence of a closure having content of magnetic material comprising, in combination: transformer means including a core, a primary winding energized from an associated power source and a secondary winding associated therewith; and a network connected to said secondary winding including: a bias resistor energized from said associated power source, a timed circuit closer, a first and a second vacuum tube controlling subsidiary circuits when conducting, said timed circuit closer operating to disconnect the first and connect the second of said tubes to said secondary upon the occurrence of an uncapped container condition, and reconnect the first of said tubes to said secondary upon the discontinuance of said condition during a predetermined time, said second tube being rendered conductive upon the continuance of said condition during said predetermined time to control a subsidiary circuit.

4. Apparatus for testing the mouth of containers to determine the presence of a closure, comprising in combination: a sensing transformer having a core, primary and secondary windings associated therewith; two vacuum tubes controlling subsidiary circuits when operative; and a timed circuit closer operating to disconnect the first and connect the second of said tubes to said secondary upon the occurrence of an uncapped container condition, and reconnect the first of said tubes to said secondary upon the discontinuance of said condition during a predetermined time, said second tube being operative to control a subsidiary circuit upon the continuance of said condition during said predetermined time.

GEORGE PHILIP STOUT.

REFERENCES CITED

The following references are of record in the file of this patent:

UNITED STATES PATENTS

| Number | Name | Date |
|---|---|---|
| 1,957,222 | Mershon | May 1, 1934 |
| 1,983,388 | Moore | Dec. 4, 1934 |
| 2,065,118 | Davis | Dec. 22, 1936 |
| 2,124,410 | Cockrell | July 19, 1938 |
| 2,125,630 | Gooding | Aug. 2, 1938 |
| 2,219,885 | Barnes et al. | Oct. 29, 1940 |
| 2,228,294 | Wurzbach | Jan. 14, 1941 |
| 2,237,254 | Broekhuysen | Apr. 1, 1941 |
| 2,318,923 | Clark | May 11, 1943 |
| 2,341,351 | Barkley | Feb. 8, 1944 |
| 2,357,512 | Gaiser | Sept. 5, 1944 |
| 2,388,812 | Albin | Nov. 13, 1945 |

FOREIGN PATENTS

| Number | Country | Date |
|---|---|---|
| 284,307 | Great Britain | Jan. 29, 1929 |